United States Patent [19]

Pruvot et al.

[11] 4,039,061

[45] Aug. 2, 1977

[54] AUTOMATICALLY CONTROLLING THE TRANSMISSION RATIOS OF AN AUTOMOTIVE VEHICLE ENGINE FOR DECREASING THE VEHICLE SPEED

[75] Inventors: Francois C. Pruvot; Roger Maistrelli; Pierre Bauchet, all of Billancourt, France

[73] Assignees: Regie Nationale des Usines Renault; Automobiles Peugeot, both of France

[21] Appl. No.: 267,208

[22] Filed: June 28, 1972

[30] Foreign Application Priority Data

July 30, 1971 France .................................. 71.28168

[51] Int. Cl.² .............................................. B60K 21/00
[52] U.S. Cl. .................................. 192/4 A; 74/866
[58] Field of Search ........................... 192/4 A; 74/866

[56] References Cited

U.S. PATENT DOCUMENTS

| | | | |
|---|---|---|---|
| 3,628,642 | 12/1971 | Ravenel | 192/4 A X |
| 3,684,066 | 8/1972 | Kubo et al. | 192/4 A |
| 3,693,479 | 9/1972 | Toyada et al. | 74/866 |
| 3,700,079 | 10/1972 | Shirai et al. | 192/4 A |

*Primary Examiner*—Benjamin W. Wyche
*Attorney, Agent, or Firm*—Stevens, Davis, Miller & Mosher

[57] ABSTRACT

Automatically controlling the transmission ratios of an automotive vehicle engine by detecting the speed of the engine, generating a signal proportional to the detected speed and comparing this signal with different predetermined reference speed signals, detecting the transmission ratio of the transmission, comparing this ratio with a predetermined reference ratio and generating a ratio signal as long as the detected ratio remains below the reference ratio, maintaining the detected ratio constant until the detected engine speed signal falls below the predetermined reference speed signal and generating a signal to increase the transmission ratio when the engine speed signal falls below the predetermined reference speed signal, and increasing the transmission ratio in the direction of the reference ratio as long as the detected speed signal remains below the predetermined reference speed signal and the detected ratio is less than the reference ratio.

12 Claims, 8 Drawing Figures

AUTOMATICALLY CONTROLLING THE TRANSMISSION RATIOS OF AN AUTOMOTIVE VEHICLE ENGINE FOR DECREASING THE VEHICLE SPEED

The present invention relates in general to methods of controlling automatic transmission mechanisms of motor vehicles.

More particularly, it relates to a control method whereby, without resorting to any additional manual control means, the engine of a vehicle equipped with an automatic transmission mechanism can be used for braking purposes.

The fact that the engine cannot be used for auxiliary braking purposes on the overrun (or when the vehicle is coasting), in the case of a motor vehicle equipped with an automatic change-speed transmission mechanism, whether of the continuous (or infinitely variable) or stepwise gear change type, is a well known inconvenience of these transmissions. In the following disclosure the term "transmission ratio" is used to designate the ratio $Rt = Vm/Vr$ of the speed of a member coupled to the engine crankshaft to that of a member coupled to the road wheels of the vehicle, and it will be assumed that $Rt = 1$ when $Rt$ has its minimum value.

In fact, the governors of automatic transmissions are so designed that when the accelerator pedal is depressed the carburetor throttle valve is opened and under certain operating conditions an increment in the transmission ratio is obtained. Each one of these two factors increases the driving torque available at the road wheels.

As the engine and vehicle speeds increase, the governor controls and provides a reduction in the transmission ratio.

Conversely, when the accelerator pedal is released the carbureter throttle valve is re-closed and the transmission ratio decreases, whereby the torque available at the road wheels decreases and the vehicle is slowed down.

When the driver releases completely the accelerator pedal for utilizing the braking resistance possibly produced by the engine in the overrun, and thus reduce the speed of the vehicle or preventing the vehicle from unduly accelerating downhill, the governor reacts as in the case of a partial release of the accelerator pedal by reducing the transmission ratio, this of course reducing likewise the possibility of properly using the engine for auxiliary braking purposes.

In fact, at a given vehicle speed the engine speed (r.p.m.) will be reduced, thus creating a lesser braking resistance. This braking resistance created at the level of the engine crankshaft will produce a braking torque at the road wheels which decreases with the transmission ratio.

This reduction in the engine braking capacity is obviously a serious inconvenience when the vehicle is driven downhill. This inconvenience is avoided in a known device by putting at the driver's disposal a small hand lever for displaying a minimum transmission ratio and by so constructing the governor that the driver cannot engage a transmission ratio lower than the preselected or displayed ratio.

In the case of transmission mechanisms providing an infinitely variable ratio or continuous gear change, an attempt to avoid the above inconvenience consisted in manually "locking" the transmission ratio at a value existing at a given moment.

Other devices are already known wherein the vehicle control means comprise a manual control member for preventing the variable-speed drive from operating at low transmission ratios while permitting a certain range of gear-ratio variation when the vehicle is being accelerated. However, these systems involve the use of a control lever or knob and reduce considerably the automatic operation of the transmission. Moreover, these additional control means may involve serious damages of certain component elements of the vehicle in case of untimely operation thereof.

Conventional automatic transmission mechanisms do not lend themselves to certain maneuvers or control actions currently used with manual change-speed gearboxes. Thus, for instance, before negotiating a short-radius turn it is current practice to apply the brakes and shift to a lower gear before reaching the sharp bent so as to have a reliable amount or reserve of acceleration available when actually negotiating the turn. In the case of an automatic transmission, releasing the accelerator pedal causes a higher or the highest gear to be engaged. Shifting to a lower speed or gear is obtained only by depressing the accelerator pedal. Under these conditions, the shift will take place only during the actual negotiation of the turn, which may cause a loss of traction.

In certain known transmission mechanisms of the continuously variable-speed type the above-mentioned inconvenience is overcome by applying a brake to automatically produce a transitory increment in the stepdown transmission ratio. However, this transitory increment in the step-down ratio during a constant time period is not applicable to all driving methods.

It is the essential object of the present invention to provide a method of controlling the use of the engine for auxiliary braking purposes, in the case of a vehicle equipped with an automatic transmission mechanism, which is exhaustively efficient when such use is required by a driver, without resorting to any additional control member.

It is another object of the present invention to provide a control method of this character which automatically limits the rotational speed of the engine by limiting the "transmission ratio" to a value not detrimental to safe driving conditions of the vehicle in case of wheel locking when applying the brakes on a slippery road surface.

A further object of this invention is to provide a control method of the type set forth hereinabove, the operation of which is released when the driver actuates the conventional controls of the vehicle, and does not require any preliminary training of the driver.

The method of controlling the use of the engine for auxiliary braking purposes according to this invention, which is applicable primarily to motor vehicles comprising pick up means for measuring in a manner known per se the rotational speed of the engine, a variable-ratio transmission mechanism providing a continuously variable ratio from a minimum value, a member for controlling the variation in the transmission ratio which has two input channels controlling with the first channel the ratio increment and with the second channel the ratio reduction, a governor controlling these two channels as a function of orders issued by the driver by depressing the accelerator pedal and also of the engine rotational speed, a member for controlling the acceleration and a brake control member, is characterized in that in a first step the transmission ratio is locked by means actuated in the inoperative condition of the member controlling the acceleration of the vehicle.

Other features of this invention will appear from the following description of the control method thereof with reference to the attached drawings illustrating diagrammatically the mode of operation of a preferred embodiments of the invention to a transmission providing a ratio varying continuously from 1 to infinity. In the drawings:

FIG. 1 is a diagram plotting the vehicle drag (Rf) due to the negative or braking torque of the thermal engine with the closed carbureter valve, as a function of the vehicle speed:

FIG. 2 plots the vehicle drag caused by the air and road surface on a level horizontal road, as a function of the vehicle speed;

FIG. 3 plots the vehicle drag caused by the negative or braking torque of the thermal engine and to the air resistance and rolling resistance, when the carbureter valve is closed, as a function of the vehicle speed;

Figure 1:
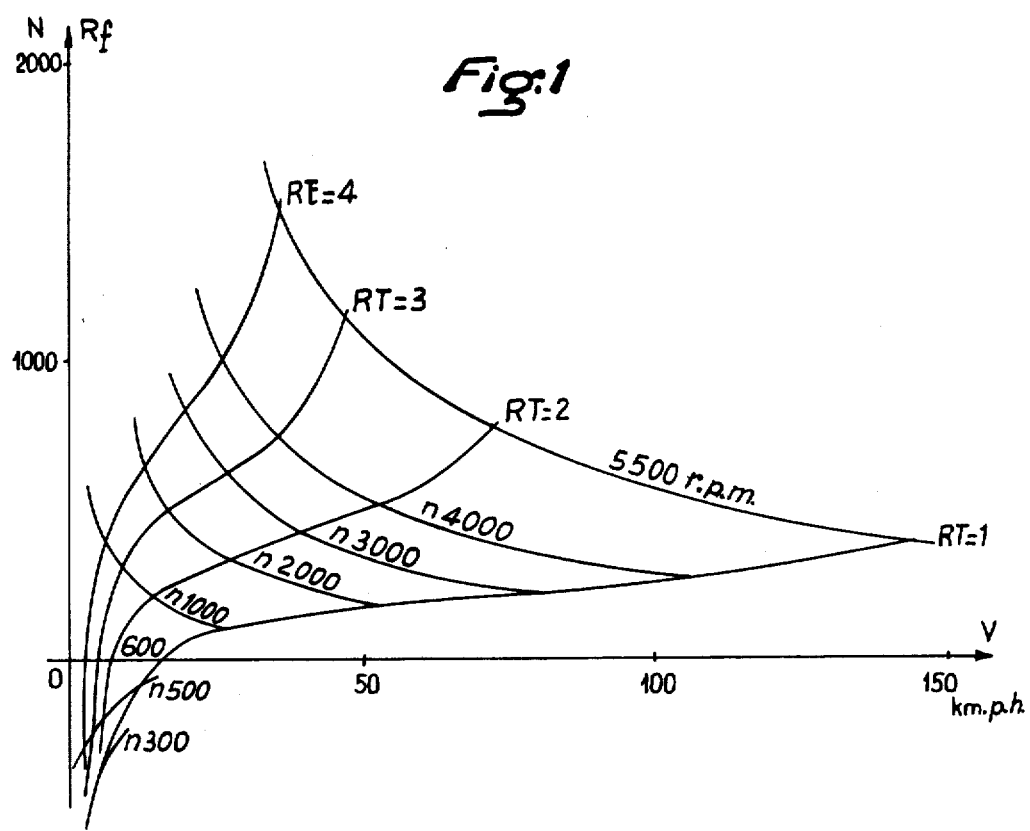

Referring first to FIG. 1, the diagram illustrates the curves corresponding to the variations in the rolling resistance (Rf) in Newtons, which are caused by the braking action or negative torque of the thermal engine having its carbureter valve closed, as a function of the speed V (in km. p.h.) of the vehicle, for a given number of transmission ratios RT.

Thus, a first pattern or curve of characteristics RT1, RT2, RT3 and RT4 corresponding to the ratios 1, 2, 3 and 4, respectively, is obtained. A second pattern of characteristics $n$ 500, ... $n$ 4,000 is obtained by plotting the rolling drag R as a function of the vehicle speed V at different rotational speed values $n$ (in r.p.m.) of the vehicle engine.

It will be seen that below an engine speed of 600 r.p.m. the rolling drag is negative; this means that the thermal engine delivers a driving torque. This torque is due to the "idling" condition, assumed to have been set at 600 r.p.m.

Figure 2:
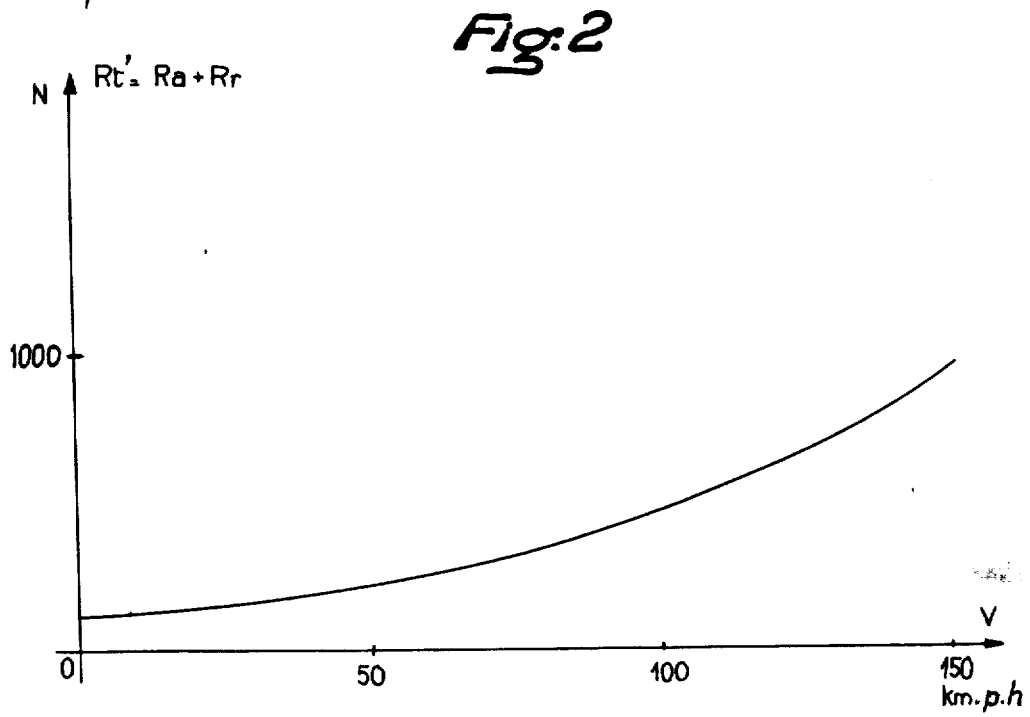

FIG. 2 shows the curve of the drag $Rt' = Ra + Rs$, due to the air and rolling drag, for a vehicle having a mass of 1,000 kg on a flat, horizontal road.

Figure 3:
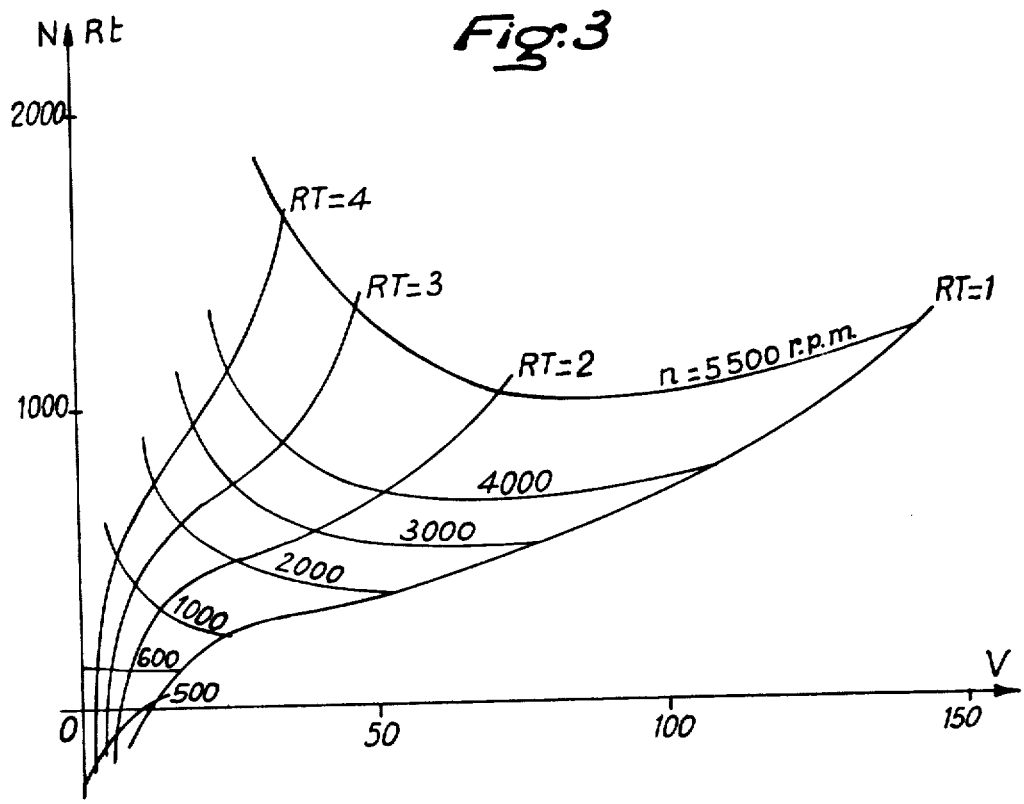

FIG. 3 illustrates the curves of the variation in the total drag $Rt$ of the vehicle having its carbureter valve closed, this drag being due to the use of the engine for auxiliary braking purposes and also to the air and road resistance. At low engine speeds there is also a drag counteracting the engine torque due to said idling condition.

To illustrate the advantage resulting from the use of this invention, the various characteristics of the vehicle (vehicle speed, engine speed, transmission ratio, drag) in the case of FIG. 3 and in various conditions of operation of the vehicle will now be described.

When the driver releases completely the accelerator pedal, he puts out of service the normal driving automatism and permits the performance of the various following functions of the device:

1. If the engine speed $n$ is higher than a first relatively low reference value $\Omega_o$ (about 2,000 r.p.m.) yet inferior to a maximum value $\Omega_s$ limited by the noise level or by a safe operation of the engine, the transmission ratio remains blocked in the same momentary conditions.

2. If the engine speed tends to decrease below the first reference value $\Omega_o$ and if the transmission ratio is lower than a reference ratio $RT_o$ of the order of 4 to 6, and inasmuch as wheel slipping took place since the accelerator was released, the governor will order an increment in the transmission ratio for keeping the engine speed at the first reference value $\Omega_o$.

3. If the transmission ratio is equal to or higher than the reference ratio $RT_o$ and if the engine speed is higher than a second reference value $\Omega_R$ of the same order of magnitude as the idling speed but below the maximum value $\Omega_s$, the transmission ratio remains unchanged.

4. If the engine speed tends to decrease to a value lower than the second reference value $\Omega_R$, the governor will order an increment in the transmission ratio RT in order to keep the speed at said value $\Omega_R$.

5. Upon each brake application and so far as no wheel slipping takes place after the release of the accelerator pedal, the governor will order a gradual increment, of limited amplitude, in the transmission ratio, unless this ratio is equal to or higher than the value $RT_o$ of the reference ratio and if the engine speed is not equal to or higher than $\Omega_s$.

Obviously, the amplitude and variation rate of the transmission ratio, during a brake application, depend on the constructional characteristics of the member controlling the transmission ratio. The transmission ratio variation will be slow enough to prevent a driver applying the brakes by successive strokes at a relatively high rate of recurrence from causing the transmission ratio to increase disproportionally.

6. When the engine speed $n$ tends to overstep the limit value $\Omega_s$, the governor orders a reduction in the transmission ratio RT for keeping the engine speed at said value $\Omega_s$. This action is preponderant over the brake action.

7. When a pick up element of the device for preventing the wheels from being locked during a brake application signals a wheel slipping, the governor cancels automatically the functions (2) and (5). This locking action is maintained until the driver has again depressed the accelerator pedal.

Figure 4:
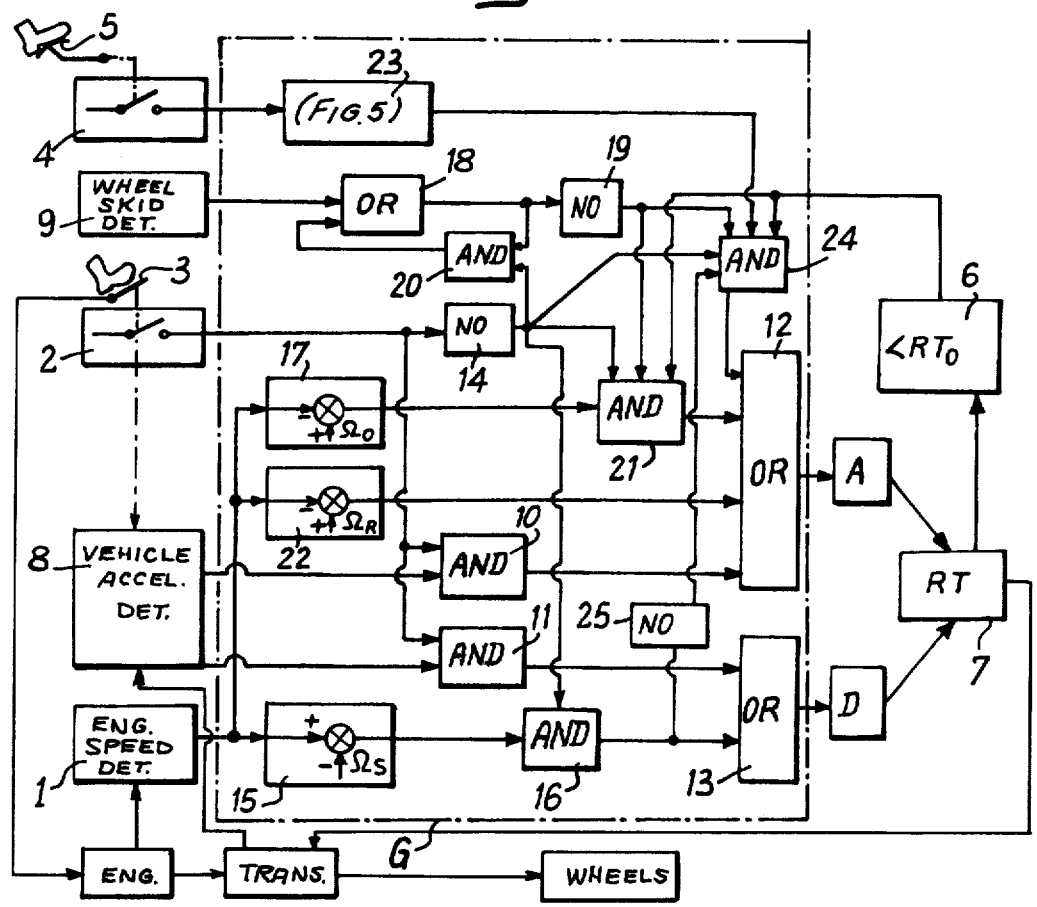
FIG. 4 is a block diagram of the governor.

In FIG. 4 showing the block diagram of the governor G the engine speed $n$ is detected by a pick up 1. The first switch 2 is closed when depressing the accelerator pedal 3; a second switch 4 is closed when depressing the brake pedal 5 or when the braking circuit is put under pressure. A third switch 6 operating like a (first) comparator is closed according to the position of control member 7 in relation to the transmission corresponding to ratio $RT_o$ (which is of the order of 4 to 6). The governor is fed from signals emitted by the normal driving automatism device 8 and also by a wheel-slip signal via a switch 9 associated with the anti-lock brake device.

Under normal driving conditions, when the first switch 2 is closed, the logic AND functions 10 and 11 transmit the signals from the normal operation automatism device 8 to the inputs A and D of the member 7 controlling the transmission ratio RT via the OR gates 12 and 13.

Conversely, when the first switch 2 is open, the signals delivered by the normal driving automatism 8 are cancelled by the AND gates 10 and 11. A "NO" logic function (inhibit) circuit 14 detecting this condition will then permit:

a. A reduction in the transmission ratio when the vehicle speed $n > \Omega_s$ (function 6). The overspeed is detected by a (fourth) comparator 15 and the permission to control the input D is delivered by the opening of AND gate 16.

b. The increment in the transmission ratio when $n < \Omega_o$, permitted by a (second) comparator 17 if the ratio RT < RTo and if no wheel slipping took place since the opening of the accelerator switch 2. The OR gate 18 is connected to the switch 9 associated with a wheel skid detector for detecting the wheel slipping in conjunction with the logic NO function (inverter) circuit 19 and constitute a memory block. The memory of this block is cancelled by the AND gate 20 receiving from the NO function circuit 14 the information for opening the switch 2.

These conditions are brought together in the AND gate 21.

On the other hand, whatever the condition of said switch 2, the governor will control the increment in the transmission ratio when a (third) comparator 22 detects that $n < \Omega R$.

Similarly, if switch 2 is open, the closing of brake switch 4 will release a function 23 controlling the gradual increase of the transmission ratio during a preadjusted time period. This order is transmitted to input A via OR gate 12 but only if AND gate 24 is open, i.e. if no wheel slipping takes place (with 18 and 19 open), if the motor is not in the overrun condition (permission from NO function (inhibit) circuit 25) and if the transmission ratio is less than RTo.

Figure 5:
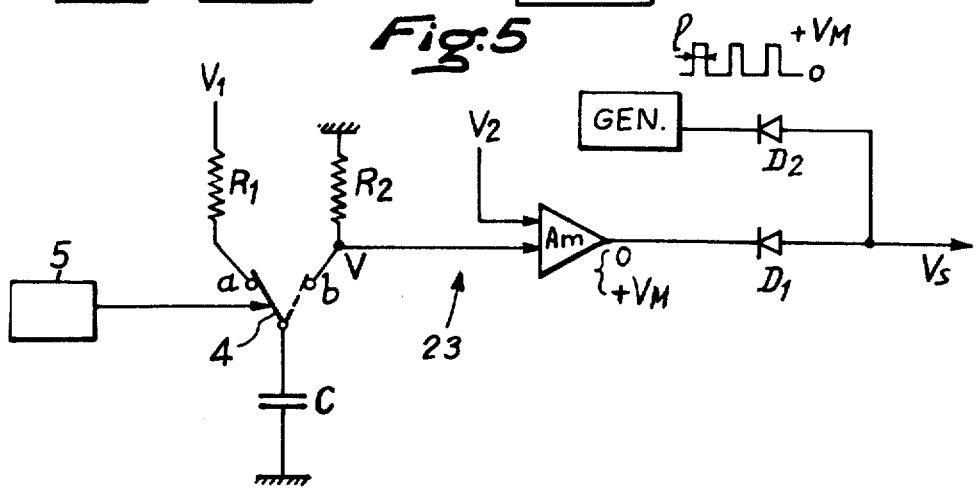
FIG. 5 is a block diagram illustating the function consisting in increasing the transmission ratio.

A typical form of embodiment of the "ratio increment function" 23 is illustrated in FIG. 5.

The second switch 4 controlled by the brake is in position $a$ when the brake is released, thus permitting the charging of a capacitor C at a voltage $V_1$ with a time constant equal to the product $R_1C$. When the brake 5 is depressed, the second switch 4 is in position $b$ and capacitor C is discharged through resistor $R_2$ with a time constant $R_2C$; this resistor $R_2$ is inserted between contact $b$ and the ground.

The voltage V measured across the terminals of resistor $R_2$ is:

zero when switch 4 is in position $a$,
maximum and equal to V when switch 4 is shifted to position $b$,
decreasing to 0 as the capacitor C is discharged through resistor $R_2$.

This voltage V is compared, at the input of an amplifier Am, with a reference voltage $V_2$. If $V > V_2$, the output voltage of amplifier Am is maximum and equal to $V_M$. If $V < V_2$, the output voltage of amplifier Am is zero.

If the time constant $R_1C$ is moderate (of the order of 0.1 second) so that the capacitor C will always be charged completely between two successive brake applications, at each capacitor discharge the output voltage of amplifier Am will be maximum during a time $\tau$ (of the order of a few seconds, for example 3 or 4 seconds) depending on the ratio of $V_2$ to $R_2C$. If the driver releases the brake pedal before the time period $\tau$ has elapsed, the output voltage Am will drop immediately to zero. The output voltage $V_S$ of amplifier Am will either stop, or permit the passage of, according to the amplifier condition, square-wave signals from a signal generator GEN, due to the presence of diodes $D_1$ and $D_2$ inserted in opposition between the output of amplifier Am and the signal generator GEN. The signals delivered by this signal generator GEN are such that when they are transmitted to the input channel A of the transmission ratio variation control member, assumed to operate as a "0 or maximum" device, the variation rate of said ratio will permit an increment in the transmission ratio of the order of 30% during the time-lag period $\tau$.

The frequency of the signals from the generator GEN of FIG. 5 should be high enough to prevent the pulses received by the control member 7 from producing variations in the torque of a hydraulic transmission member transmitted to the vehicle wheels. The evolution rate of the transmission ratio is adjusted by varying the width "1" of the signals produced by generator GEN. It will be noted that this signal could be delivered by the normal driving automatism.

It will be seen that the ratio increment function 23 is capable of producing an increment in the transmission ratio in case of recurrent brake applications at a relatively high rate, which would be equal to the increase in the transmission ratio in the case of several prolonged brake applications with a time interval $\tau$.

The circuit diagram of FIG. 4 and the exemplary form of embodiment of the time-lag function 23 of FIG. 5 are adapted to control the input channels A and D in a "0 or maximum" manner through logic elements. Of course, those skilled in the art may adapt this diagram to specific cases, for example when the signals controlling said channels A and D are analogic ones.

On the other hand, it would not constitute a departure from the basic principles of this invention to replace the conventional commercial logic elements illustrated in FIG. 4 with other equivalent means (such as switches, relays, transistors, etc. . . . ) or different means (AND, OR . . . ) provided that their combination yields the same functions as those of the above-described example.

Now the mode of operation of a vehicle equipped with this device will be described by considering different driving conditions.

The absence of a signal will be denoted as "O", and the presence of signal is indicated by a 1. Likewise, Ii designates the signal input of a block $i$ and $Sj$ the signal output of a block $j$. For example: I14 = 0, no signal is applied to the input of block NO 14. In the case of a member having several inputs, the individual inputs will be referenced as follows: I21 (19), i.e. input of block 21 from block 19.

Figure 6:
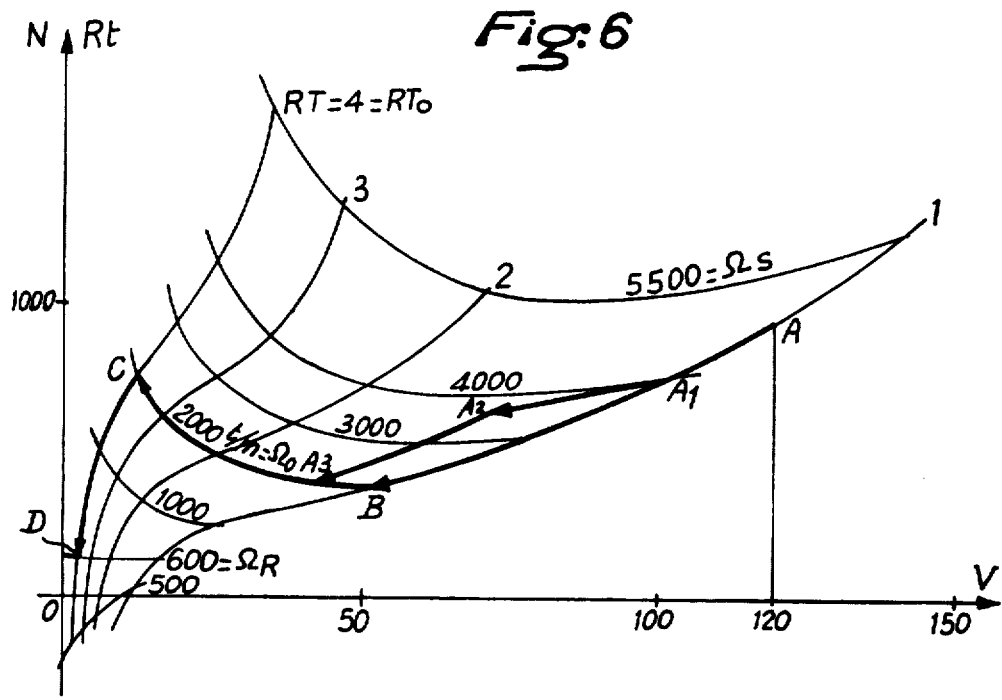
FIG. 6 illustrates the successive values of the vehicle speed V, of the transmission ratio RT, of the thermal engine speed $\Omega$ and of the resistance to rolling Rf, when the driver releases the accelerator pedal without applying the brakes.

1st case.—The vehicle is being driven at high speed and the driver wants to bring it gradually to a standstill. The evolution of the point of operation of the vehicle is illustrated in FIG. 6.

Assuming that the vehicle is driven at 120 km.p.h. with an engine speed of 5,500 r.p.m. on a level road, and that the driver releases the accelerator pedal slowly enough to cause the normal driving automatism to order the reduction in the transmission ratio before the accelerator is released completely. The point of operation is then A and the drag exerted on the vehicle is 950 N.

The normal operation automatism 8 has controlled the change to the lowest transmission ratio by energizing in succession the gates AND 11, OR 13, input D and control member 7 (FIG. 4).

When the accelerator pedal is released completely and if the driver does not apply the brakes, the transmission ratio will remain RT = 1 and the vehicle will continue to slow down until the engine speed is equal to the first reference value $\Omega_o$ = 2,000 r.p.m. (point B). During this intial deceleration period, S2 = 0, I10 (2) = 0, and I12(10) = 0. As long as the driver does not apply the brakes, S4 = 0; I23 = 0; S23 = 0; I24(23) = 0, S24 = 0 and I12(24) = As As long as the thermal engine speed $\Omega$ is higher than $\Omega_o$, then S17 = 0 = I21(17); therefore S21 = 0 and I12(21) = 0. Also, the thermal engine speed $\Omega$ exceeds the idling speed $\Omega r$; therefore S22 = 0 and I12(22) = 0. All the inputs of OR gate 12 being zero, S12 = 0, IA = 0 and SA = 0. At the same time, S2 = 0; thus, I11(2) = 0; S11 = 0 and I13(11) = 0.

Since the thermal engine is not operating under overspeed conditions, S15 = 0 = I16(15); S16 = 0, I13(16) = 0 and S25 = 1. Consequently, S13 = 0, ID = 0 and SD = 0. The drag, then still of the order of 400 N, tends to cause the engine speed to drop below $\Omega_o$. The transmission ratio increases up to $RT_o$ and it will be assumed that this value is 4, in order to keep the engine speed at 2,000 r.p.m. (function 2 of the governor).

When the speed of the thermal engine drops to $\Omega_o$ = 2,000 rpm, the point of operation is at B; then S17 = 1 and I21(17) = 1. Since the accelerator pedal is not depressed, S2 = 0; S14 = 1 and I21(14) = 1. If no wheel skid has occurred, S9 = 0 = I18(9); S18 = 0 = I19; and S19 = 1 = I21(19). Since the transmission ratio is lower than $RT_o$ = 4, S6 = 1 = I21 (6). Finally, as long as engine speed remains below $\Omega_r$, S25 = 1 = I21(25). Under these conditions S21 = 1 = I12(21 and S12 = 1 = IA, and therefore SA = 1. The point of operation then moves from B to C and then the auxiliary braking force exerted by the engine is 750 No. At C the transmission ratio $RT_o$ = 4. Then S6 = 0 = I21(6) and S21 = 0 = I12(21); thus S12 = 0 = IA and SA = 0. The transmission ratio does not vary anymore. Since S12 = S13 = 0, the vehicle keeps slowing down and the point of operation is shifted from C to D, where the engine speed drops to the second reference value $\Omega_R$ assumed to be the idling speed (600 r.p.m.).

The residual drag causes an additional decrease of speed and the engine r.p.m. value tends to drop below $\Omega_R$.

The transmission ratio then increases to infinity in order to endeavour to keep the engine at idling speed (600 r.p.m.), due to the function 4 of said governor. Then S22 = 1 = I12(22 and S12 = 1, whereby IA = 1. The transmission ratio will thus increase until the vehicle has come to a complete standstill.

From the foregoing it will be seen that between points B and D and notably at C the driver can use the engine for auxiliary braking purposes with an efficiency considerably better than in the case of a normal automatic transmission preserving the transmission ratio from 1 to full stop. it will also be seen that with this invention it is possible to stop the vehicle under conditions quite similar to those obtained by a driver driving a vehicle equipped with a conventional manual changespeed transmission mechanism.

2nd case.—If the driver applies the brakes between A and B, the transmission ratio will increase by a finite quantity, for example by 30%, whereafter the ratio will be blocked again if the driver does not make other control actions or manoeuvres (function No. 1 of the governor). The point of operation will then describe the cycle A, A1, A2, A3 where the engine speed is $\Omega_o$.

A brake application occurring between Ao and B will close contact 4, whereby function 23 will deliver an output signal: S23 = 1 and I24(23) = 1. Moreover, since RT < $RT_o$, S6 = 1 = I24(6); the absence of wheel skid will yield the result I21(19) = 1; the absence of acceleration will yield the result I21(14) = 1. When the engine is not in the overrun condition, the result is S15 = 0 = I16(15) = I25 and S25 = 1 = I24(25). Therefore, in the second case I24 = 1 and S24 = 1, whereby S12 = 1 = EA = SA, and the point of operation is shifted from A1 to A2. At the point A2 the transmission ratio, increased by 30%, does not rise anymore and the point of operation is shifted from A2 to A3.

Figure 7:
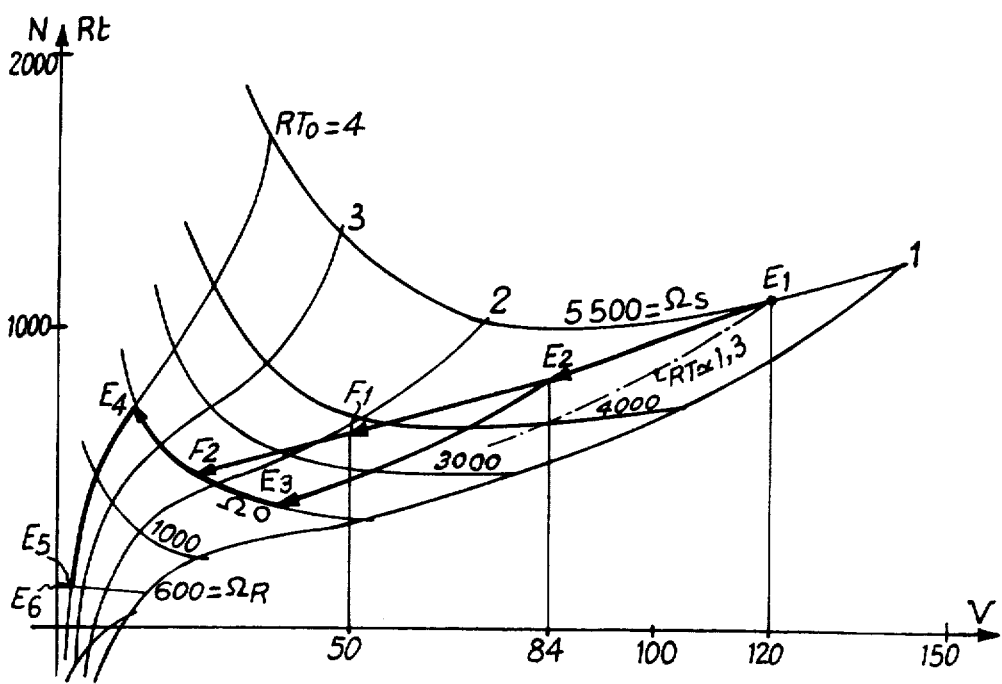
FIG. 7 shows the same successive values as in FIG. 6, when the driver releases the accelerator pedal and applies the brakes with force.

3rd case.— Emergency brake application: the evolution of the point of operation is illustrated in FIG. 7. As in the preceding case, it is assumed that the vehicle is driven at 120 km.p.h. on a level road at an engine speed of 5,500 r.p.m., and that the driver suddenly releases the accelerator pedal and applies the brake with force due to an oncoming obstacle.

Then S2 = 0, I11(2) = 0 and S11 = 0. Under these conditions, the orders transmitted from the normal operation device 8 are thus blocked. Moreover, since the driver has also applied the brake the 2nd case is applicable.

The time is not sufficient for allowing the transmission ratio (of 1.3) to drop appreciably. Therefore, the initial point of operation is $E_1$. If the driver applies the brakes very strongly, so as to produce, say, a drag equal to half the weight or mass of his vehicle, the deceleration may be of the order of 5 meter/sec². Assuming that the prolonged brake application increases the transmission ratio by 30% in 2 seconds, the vehicle speed will have dropped by 10 m/s or 36 km.p.h. when the transmission ratio has been blocked again at 1.6.

The point of operation will thus be shifted from $E_1$ to $E_2$. Between points $E_1$ and $E_2$, the vehicle is caused to slow, and after a time $\tau$, S23 = 0. The transmission ratio does not vary afterwards and the vehicle decelerates according to the process described in the 1st case, the point of operation being shifted along the path $E_2, E_3, E_4, E_5$ and $E_6$, similar to that of FIG. 6. If the driver keeps the brake pedal depressed, the point of operation will describe a segment $E_2$ to $E_3$ with the constant ratio 1.6, down to a speed $\Omega_o$, then a segment $E_3$ to $E_4$ at constant speed, a segment $E_4$ to $E_5$ with a constant ratio $RT_o$, and eventually a segment $E_5$ to $E_6$ at the idling speed $\Omega_R$.

If at $E_2$ the driver releases the brakes during a short time and re-applies them strongly, the transmission ratio will increase again by about 30% while the speed drops to about 50 km.p.h.

The function 23 for increasing the transmission ratio then delivers another signal S23 = 1 and controls as in the 2nd case a transmission ratio increment. The point of operation is then shifted from $E_2$ to $F_1$. Another brake application will shift the point of operation from $F_1$ to $F_2$. Since at $F_2$ the thermal engine speed is $\Omega_o$ = 2,000 rpm, the process is continued as in 1st 1st case.

From the foregoing it is thus clear that this invention permits an evolution of the transmission ratio in the proper direction, as in the preceding case.

Figure 8:
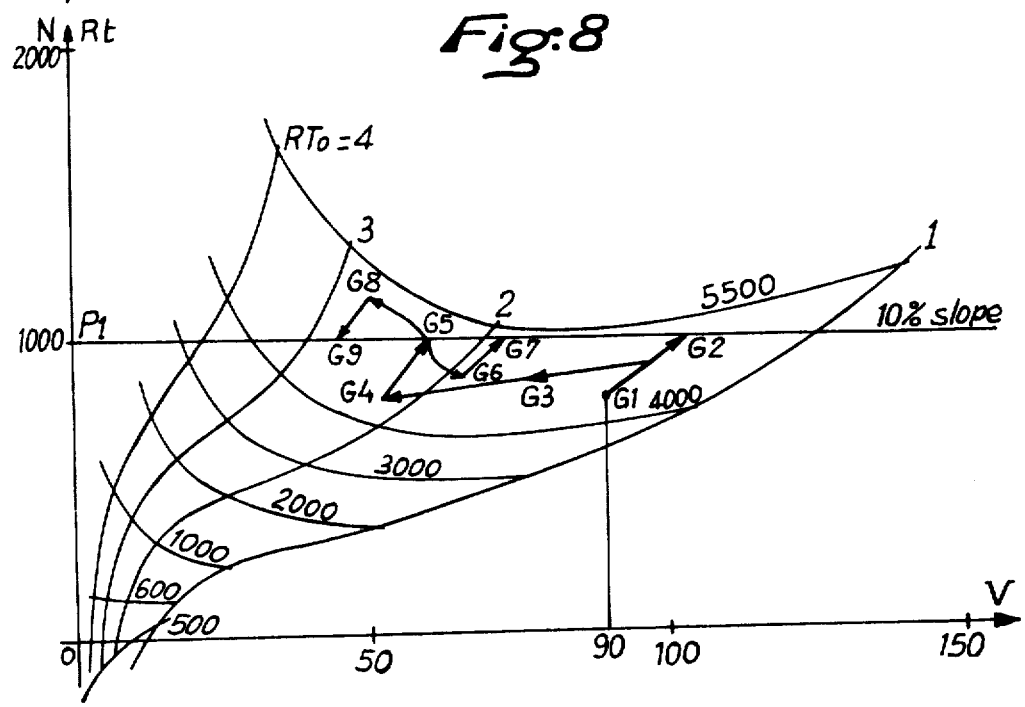
FIG. 8 shows the same successive values as in FIG. 6, when the driver actuates by turns the accelerator pedal and the brake pedal, and when the vehicle is being driven downhill.

4th case. — Vehicle driven along a long downhill road:

The evolution of the point of operation is illustrated in FIG. 8.

Assuming that the vehicle is being driven on a level road at 90 km.p.h. with the engine rotating at 4,500 r.p.m., while approaching a 10% slope down characterised by a power thrust $P_1$ of the order of 1,000 N.

The driver suddenly releases the accelerator; the point of operation is then at $G_1$. The transmission ratio is blocked and as the power thrust $P_1$ is greater than the braking force at $G_1$, the vehicle accelerates to $G_2$ whereat the vehicle speed becomes stabilized.

Considering the road surface condition, the driver may be induced to drive at a lower speed; therefore, between $G_1$ and $G_2$ he will apply the brakes, thus reducing the slope effect and controlling an increment in the transmission ratio. A brake application is attended by an increment in the transmission ratio from the temporary signal delivered by function 23. Thus $S23 = 1$. The point of operation will be shifted from $G_2$ to $G_3$, then to $G_4$ after a second brake application.

Now let us assume that at $G_4$ the driver feels he has retarded the vehicle sufficiently and therefore releases the brake pedal; the transmission ratio will be blocked and since the power thrust $P_1$ is superior to the braking force at $G_4$ the vehicle will accelerate until point $G_5$ is reached, the vehicle speed being stabilized at that point.

It will also be seen that beyond the stabilized point of operation $G_5$ the governor lends itself particularly well to the driver's control action (such as increasing or decreasing the vehicle speed, obtained by depressing the accelerator or the brake pedal). In fact, if the driver wishes to increase slightly the vehicle speed, he depresses moderately the accelerator pedal. Considering the engine r.p.m. the gas throttle will remain closed or open only moderately. The normal control automatism of the transmission ratio will produce a reduction in the transmission ratio, since the normal driving automatism will react as if the driver had just released the accelerator. The retarding action exerted on the vehicle will decrease and therefore the vehicle will be accelerated. The contact 3 then would close and the orders transmitted by the normal operation device 8 would thus permit the opening of AND gates 10 and 11 so that $S10 = 1$, $S11 = 1 = I13(11)$, $S13 = 1$, ID and $SD = 1$. The point of operation is thus shifted from $G_5$ to $G_6$ and entails a reduction in the transmission ratio.

When the driver is about to release the accelerator (point $G_6$) he again blocks the transmission ratio (function 1 of the governor) and the point of operation will evolve towards $G_7$ whereat the vehicle speed will be stabilized to a value higher than that observed at $G_5$.

Conversely, if the driver wants to reduce slightly the vehicle speed after $G_5$, he depresses moderately the brake pedal, possibly by just touching slightly same, thus controlling an increase in the transmission ratio, as before, for $S23 = 1$. The point of operation will evolve towards $G_8$ for the increment in the braking force reduces the vehicle speed. Since the increment in the transmission ratio is limited to 30% for each brake application, the transmission ratio will be blocked automatically at $G_8$. Then the point of operation will be shifted to $G_9$ whereat the vehicle speed is stabilized at a value lower than the vehicle speed at point $G_5$.

Under these conditions it will be seen that the governor adapts itself to the normal reflexes of the driver by enabling him to rapidly find a stabilized speed. This is particularly advantageous in the case of prolonged downhill driving (for example on mountain roads).

It will also be seen that if the driver is confronted with a very steep slope down in comparison with the engaged gear, and if he does not apply the brakes, the engine will tend to rotate at a speed higher than $\Omega$, and the governor will order a reduction in the transmission ratio, thus avoiding any risk of damaging the engine (function 6 of the governor).

5th case. — Wheel slipping during a brake application.

Wheel slipping occurs of course when an excessive braking effort is exerted on the wheels, considering the road surface condition. If an anti-lock braking device is fitted to the vehicle, slithering is kept to a very low level.

The governor prevents an increment in the transmission ratio as long as the engine speed is higher than the idling value. Therefore, the braking effort exerted on the wheels remains moderate when the wheels resume their road adherence. In this case the vehicle is stopped normally through the anti-lock brakes. Since the braking effect of the engine is cancelled at idling speed (FIG. 1) no appreciable wheel slipping can take place at low vehicle speed.

Under these conditions it is the slowing down of the vehicle, due to the conventional brake application, that will cause the engine r.p.m. value to drop below $\Omega_R$ and control the increment to infinity of the transmission rate until the vehicle is brought to a standstill.

If the vehicle is equipped with an anti-skid detector (9), $S9 = 0$ if no wheel skid is recorded. If the driver accelerates, $S2 = 1 = I14$; $S14 = 0 = I20(14)$, and in this case $S20 = 0$. The two inputs of the OR function (18), $I18(9)$ and $I18(20)$ are null; the output signal $S18 = 0$.

When the driver stops accelerating, $S2 = 0 = I14$, $S14 = 1 = I20(14)$. However, $S20 = 0$ for $S18 = 0$ (the wheel is not skidding). If wheel skid occurs during a brake application: $S9 = 1$ and $S18 = 1$; now $S2 = 0$ for the accelerator pedal (2) is released; $I14 = 0$ and $S14 = 1$, and therefore $I20(14) = 1$. The two requirements: $S18 = 1 = I20(18$ yield an output signal $S20 = 1$; $I20(14) = 1$.

When wheel skid ceases: $S9 = 0 = I18(9)$, but $S18 = 1$ for $S20 = 1$. Since $S18 = 1$, even if the wheel skid ceases, it can be asserted that the logic functions 18, 20 constitute a memory function. This memory is destroyed when wheel skid ceases ($S9 = 0$) and provided that the driver accelerates again ($S2 = 1$). In fact, in this case $I14 = 1$, $S14 = 0$, and therefore $S20 = 0$ and $S18 = 0$. The wheel skid recorded by $S18 = 1$, is attended by $S19 = 0$. The AND gate 21 is closed ($S21 = 0$) as well as AND gate 24 ($S24 = 0$). Under these conditions it is no longer possible to control the increment in transmission ratio when the brake is applied and when the thermal engine speed decreases to 2,000 rpm.

In the case of a continuously variable transmission mechanism, i.e. a mechanism providing a gradual change of the transmission ratio from 1 to infinity and vice versa, a modified form of embodiment of the present invention will consist in not limiting the increment of the transmission ratio to the above-defined value RTo when the speed tends to drop to a value below the reference value $\Omega_o$.

This modified form of embodiment utilizes a simpler governor applicable to a transmission providing a continuously variable ratio, from 1 to a finite value RT1.

In the case of a vehicle equipped with an automatic-control change-speed gear mechanism, the functions (1) to (7) defined hereinabove are simplified as follows:

When the rotational speed of the thermal engine drops below a value $\Omega'_o$ slightly inferior to the reference value $\Omega_o$, the governor controls the shifting to the next upper ratio; thus, the engine speed will attain a value $\Omega''_o$; the values of $\Omega'_o$ and $\Omega''_o$ are selected to lie on either side of the above-defined value $\Omega_o$.

When the driver depresses at least twice the brake pedal without accelerating, the governor orders the shifting to the next lower transmission ratio, unless this gear change entails an engine speed higher than $\Omega_s$.

On the other hand, the functions 1, 6 and 7 are still operative while functions 3 and 4 are eliminated.

The control data are supplied by memories rendered operative in succession upon each brake application. Depressing the accelerator pedal or performing a ratio-shift order will zero all memories, according to a conventional logic diagram.

Although the present invention has been described with reference to specific examples, forms of embodiment and circumstances, it will readily occur to those conversant with the art that various modifications and variations may be brought thereto without departing from the basic principle of the invention as set forth in the appended claims.

What is claimed as new is:

1. In a vehicle having an engine driving the wheels of the vehicle through a variable speed ratio transmission, means to vary the ratio of the transmission, engine speed control means and manual braking means, a method for controlling the transmission ratio for braking the vehicle, comprising the steps of:
    detecting the speed of said engine and generating a signal proportional to the detected speed;
    comparing the detected engine speed signal with a predetermined reference speed signal;
    detecting the transmission ratio of said transmission and comparing the detected ratio with a predetermined reference ratio;
    generating a ratio signal as long as the detected ratio remains below said reference ratio;
    maintaining the detected ratio constant until said detected engine speed signal falls below said predetermined reference speed signal;
    generating a signal to increase said transmission ratio when said engine speed signal falls below said predetermined reference speed signal; and
    increasing said transmission ratio in the direction of said predetermined reference ratio as long as said detected speed signal remains below said reference speed signal and said detected ratio is less than said reference ratio.

2. The method according to claim 1, further comprising the steps of: generating a braking signal upon application of said manual braking means; and generating a second transmission ratio increase signal to increase said transmission ratio in the direction of said reference ratio when said braking signal is generated and said detected ratio is below said reference ratio.

3. The method according to claim 2, comprising the further steps of: comparing said detected engine speed signal with a second reference speed signal higher than said first reference speed signal; and generating a signal to decrease said transmission ratio when said detected engine speed signal rises above said second reference speed signal, said transmission ratio decrease signal inhibiting the generation of said second transmission ratio increase signal.

4. The method according to claim 2, comprising the further steps of:
    generating an acceleration signal upon application of said engine speed control means to inhibit the generation of the first and second transmission ratio increase signals as long as said engine speed control means is applied; and
    generating a further signal representing the acceleration of said vehicle and applying said further signal to said transmission ratio varying means to adjust the transmission ratio as a function of vehicle acceleration as long as said engine speed control means is applied.

5. The method according to claim 4, comprising the further step of generating a third transmission ratio increase signal when said detected engine speed signal falls below a second predetermined reference speed.

6. The method according to claim 4, comprising the further step of detecting slipping of a wheel of the vehicle and generating a signal indicating wheel slippage until said acceleration signal is generated to inhibit the generation of said slippage indicating signal, the generation of said first and second transmission ratio increase signals being dependent on said slippage indicating signal.

7. The method according to claim 1, comprising the further steps of: comparing said detected engine speed signal with a second reference speed signal higher than said first reference speed signal; and generating a signal to decrease said transmission ratio when said detected engine speed signal rises above said second reference speed signal.

8. The method according to claim 7, comprising the further step of generating an acceleration signal upon application of said engine speed control means to inhibit the generation of said transmission ratio increase and transmission ratio decrease signals as long as said engine speed control means is applied.

9. In a vehicle having an engine driving the wheels of the vehicle through a variable speed ratio transmission, means to vary the ratio of the transmission, engine speed control means and manual braking means, apparatus for controlling the transmission ratio for braking the vehicle, comprising:
    first comparator means comparing a measured transmission ratio of said transmission with a preset reference ratio and generating an output signal when the measured ratio is not greater than said reference ratio;
    second comparator means for comparing a measured speed of said engine with a preset reference speed and generating an output signal when said measured speed is less than said reference speed; and
    means coupling the outputs of said first and second comparator means to said transmission ratios varying means for increasing said transmission ratio in response to output signals generated by both of said first and second comparator means concurrently.

10. The apparatus according to claim 9, further comprising:
    third comparator means for comparing said measured engine speed with a second preset reference speed lower than the first reference speed of said second comparator means and generating an output signal when said measured engine speed falls below said second reference speed; and means coupling the output of said third comparator means to said transmission ratio varying means to increase said transmission ratio in response to the output signal of said third comparator means irrespective of the outputs of said first and second comparator means.

11. The apparatus according to claim 10, further comprising:

fourth comparator means for comparing said measured engine speed and a third preset reference speed higher than said first reference speed and generating an output signal when said measured engine speed is higher than said third reference speed; and further means coupling said fourth comparator means to said transmission ratio varying means to decrease said transmission ratio in response to the output signal of said fourth comparator means.

12. The apparatus according to claim 11, further comprising:

inhibit means coupled to the output of said speed control means to generate an inhibit signal when said speed control means is applied to increase engine speed; and wherein:

said transmission ratio varying means comprises means to increase said ratio and separate means to decrease said ratio;

said means coupling the outputs of said first and second comparator means to said transmission ratio varying means comprises a first AND circuit having first and second inputs coupled to the outputs of said first and second comparator means, respectively, a third input coupled to the output of said inhibit means, and an output coupled to said ratio increase means;

said further means coupling the output of said fourth comparator means to said transmission ratio varying means comprises a second AND circuit having first and second inputs coupled to the outputs of said fourth comparator means and said inhibit means, respectively, and an output coupled to said ratio decrease means; and the outputs of said first and second AND circuits are inhibited when said speed control means is applied to increase engine speed.

* * * * *